UNITED STATES PATENT OFFICE.

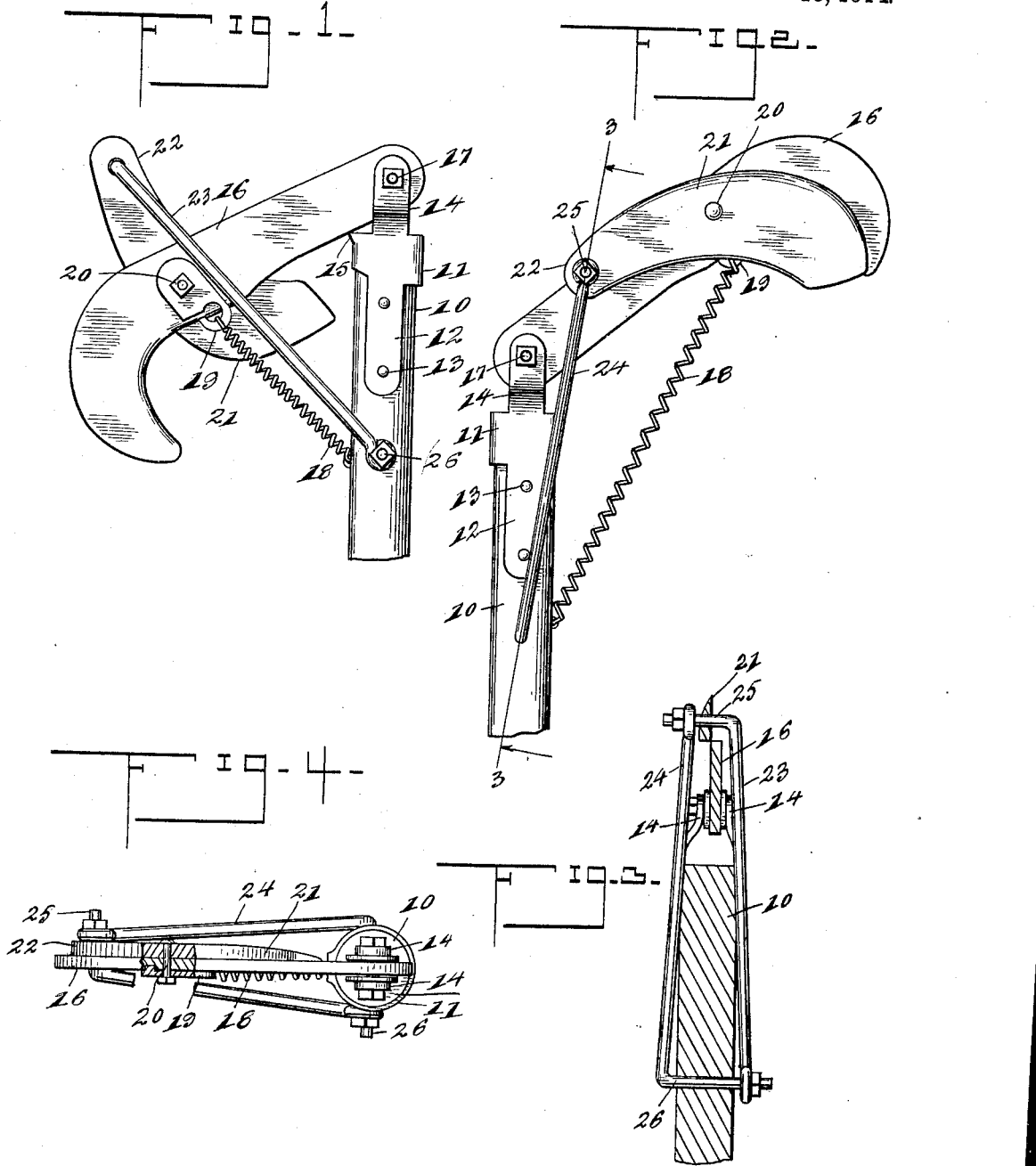

WILLIAM H. SOUPENE, OF MANHATTAN, KANSAS.

PRUNING IMPLEMENT.

1,084,373.  Specification of Letters Patent.  Patented Jan. 13, 1914.

Application filed November 14, 1912.  Serial No. 731,395.

*To all whom it may concern:*

Be it known that I, WILLIAM H. SOUPENE, a citizen of the United States, residing at Manhattan, in the county of Riley, State of Kansas, have invented certain new and useful Improvements in Pruning Implements; and I do hereby declare the following to be a full, clear, and exact description of the invention, such as will enable others skilled in the art to which it appertains to make and use the same.

This invention relates to pruning implements and has for an object to provide a device of this character having crossed knives connected to a common handle which when pulled down after the knives have been applied to a branch will close the knives simultaneously with resultant severing of the branch.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of the device with the jaws open. Fig. 2 is a side elevation of the device with the jaws closed. Fig. 3 is a longitudinal sectional view taken on the line 3—3 Fig. 2. Fig. 4 is a plan view of the parts shown in Fig. 1.

Referring now to the drawing in which like characters of reference designate similar parts, 10 designates a handle to the upper end of which is fixed a ferrule 11 having parallel attaching lugs 12 which are bolted to the handle as shown at 13 and having parallel hinge lugs 14 which project beyond the tip of the handle, there being a laterally directed stop lug 15 on the edge of the ferrule near the hinge lugs.

A substantially L-shaped knife 16 has the shank pivoted between the hinge lugs 14 by means of a pivot bolt 17, the blade normally being held against the stop lug 15 by means of a helical spring 18 which is connected at one end to the handle below the ferrule and is connected at the opposite end to a hook 19 which is secured by a pin 20 to the knife.

An arcuate knife 21 is pivoted centrally on the pin 20. The heel 22 of this knife is connected to the handle 10 by means of parallel links 23 and 24 one of which is formed with an integral pin 25 that passes through the heel of the knife and through the other link, and the last named link being formed with an integral pin 26 which passes through the handle and through the first named link. These links extend along the opposite sides of the knives 16 and 21, and in normal position of the parts the links extend longitudinally of the knife 21 to which they are attached and transversely across the knife 16 carried by the handle.

In the normal position of the parts the common pivot 20 of the knives is disposed below the pivotal connections 17 and 25 of the knives with the handle while the free ends of both blades are spaced apart to receive therebetween the branch or twig desired to be severed. In operation, the handle is raised and the blades placed astride of the branch from above, and then the handle is pulled downwardly. The branch resists being pulled down consequently during continued lowering movement of the handle the blade 16 will be raised on the handle against the tension of its spring while the blade 21 will be swung on its pivot with a resultant closing of the blades in the nature of a pair of shears, the points of the blades contacting at the final stage of closing movement, whereby the branch is severed, and after severing of the branch the blades are immediately returned to normal position by the spring 18.

What is claimed is:—

A pruning implement including a handle, a knife pivotally connected to the handle and inclining downwardly on one side thereof, a second knife pivotally connected intermediate the ends to the intermediate portion of the first named knife and extending transversely across the first named knife, a link having a transversely bent end engaged through said handle and forming a pivot, and having the opposite end terminating in an eye, a second link having a transversely bent end engaged through the heel of the second named blade and through said eye and having the opposite end terminating in an eye engaging said pivot, said links being disposed upon opposite sides of said knives, a stop lug formed on the tip of said handle, and a helical spring connected to the first named knife and to said handle and normally extending parallel with said links and serving to normally hold said first named knife against said stop lug whereby said knives are held open.

In testimony whereof, I affix my signature, in the presence of two witnesses.

WILLIAM H. SOUPENE.

Witnesses:
J. A. TRAVIS,
C. D. HOFMAN.

Copies of this patent may be obtained for five cents each, by addressing the "Commissioner of Patents, Washington, D. C."